United States Patent [19]

Abe et al.

[11] Patent Number: 4,506,718

[45] Date of Patent: Mar. 26, 1985

[54] PNEUMATIC TIRES FOR OFF-ROAD VEHICLES

[75] Inventors: Masaru Abe, Sayama; Isao Miyoshi, Kodaira; Toshiro Tezuka, Higashi-Murayama; Toshio Yoshimoto, Akigawa, all of Japan

[73] Assignee: Bridgestone Tire Company Limited, Tokyo, Japan

[21] Appl. No.: 137,694

[22] Filed: Apr. 7, 1980

Related U.S. Application Data

[63] Continuation of Ser. No. 645,190, Dec. 29, 1975, abandoned.

[30] Foreign Application Priority Data

Dec. 28, 1974 [JP] Japan .................................. 50-3823
Jun. 6, 1975 [JP] Japan .................................. 50-67526

[51] Int. Cl.³ .......................... B60C 9/20; B60C 9/10
[52] U.S. Cl. ....................... 152/361 R; 152/361 DM; 152/354 R; 152/359
[58] Field of Search ............ 152/354 R, 354 RB, 356, 152/355, 359, 361 R, 361 FP, 361 DM

[56] References Cited

U.S. PATENT DOCUMENTS

| | | | |
|---|---|---|---|
| 3,682,222 | 8/1972 | Alderfer | 152/361 R |
| 3,700,012 | 10/1972 | Alderfer | 156/425 |
| 3,712,362 | 1/1973 | Alderfer | 152/361 R |
| 3,982,580 | 9/1976 | Inoue et al. | 152/361 R |

*Primary Examiner*—Lois E. Boland
*Attorney, Agent, or Firm*—Sughrue, Mion, Zinn, Macpeak and Seas

[57] ABSTRACT

A pneumatic tire for off-road vehicles, comprising a carcass body containing organic fiber cords and a breaker composed of at least one rubberized layer each containing reinforcing elements embedded therein and having an overall cut resistant property for all types of cuts together with an excellent separation resistant property and high abrasion resistant property is disclosed. The reinforcing element is composed of a bundle formed by merely assembling helically formed filaments together without twisting. The reinforcing element is formed of a material having a tensile strength of at least 140 Kg/mm² and an elongation at breaking strength which is 0.15 to 1.7 times that of the organic fiber cord of the carcass body.

6 Claims, 30 Drawing Figures

$$D = \frac{Dmax + Dmin}{2}$$

$$D = \frac{D_{max} + D_{min}}{2}$$

FIG_4

PNEUMATIC TIRES FOR OFF-ROAD VEHICLES

This is a continuation of application Ser. No. 645,190, filed Dec. 29, 1975, now abandoned.

This invention relates to pneumatic tires for off-road vehicles, for example, construction vehicles such as a dump truck, scraper, loader and the like, cultivation vehicles such as a logskidder, logforward and the like and industrial vehicles such as a forklift, yard truck, trailer and the like.

These kind of pneumatic tires are used on off-road environments where obstructions such as rocks, pieces of broken metal and glass, stubs are scattered thereon. In addition, the load subjected to one tire is generally large. As a result, such pneumatic tires are required to have a high resistance against damage due to cuts (hereinafter will be called as cut resistant property) and to be used for a long time.

The most important properties required for such tires are the cut resistant property, resistance against separations in and between layers on the crown portion and any other portions of the tire (hereinafter will be called as separation resistant property) and abrasion resistant property. Particularly, it has been deemed necessary to increase the cut resistant property.

Attempts have heretofore been made to improve the cut resistant property of such tires. But, these attempts did not always succeed to improve the cut resistant property of the tire. In addition, the tire has vital drawback with respect to the separation resistant property at the crown portion and any other portions of the tire, so that it has been difficult to use the tire for off-road vehicles.

As a first type of conventional tires, it has heretofore been proposed to use a so-called wire under tread tire (hereinafter will be called as WUT tire). The WUT tire comprises a rubberized layer containing thin metallic wire filaments embedded therein and each having a length on the order of 10 mm and disposed between the tread rubber and the carcass so as to prevent growth of the damage due to cuts started from the tire tread and penetrating into the interior portion of the tire as described, for example, in U.S. Pat. Nos. 3,085,616, 3,095,026, 3,095,027, 3,097,915, 3,057,389, 3,050,098 and 3,043,357. The WUT tire has been tried to be sold in market. In practice, however, if the amount of the metallic wire filaments embedded in the rubberized layer is increased so as to obtain a sufficiently high cut resistant property, separation frequently occurs within a wire under tread layer (hereinafter will be called as WUT layer) or between the WUT layer and the tread rubber or between the WUT layer and the carcass, thereby inducing premature separation failure obviating any of merits of improving the cut resistant property.

On the contrary, if the amount of the metallic wire filaments embedded in the rubberized layer is decreased so as to prevent the premature separation failure, the desired cut resistant property could not be obtained. As a result, the attempts of improving overall durability of the WUT tire have not been realized from the practical standpoint of view.

A second type of conventional tires is a tire having a steel cord breaker. As well known in the art, a typical steel cord is composed of a cord formed by twisting together a plurality of strands, each strand being formed by twisting together a plurality of thin elongate filaments each having a diameter on the order of 0.15 mm to 0.3 mm. A rubberized layer containing the above mentioned steel cords embedded therein and equally spaced apart from each other is disposed between the carcass and the tread rubber so as to prevent growth of the damage due to cuts started from the tire crown portion and penetrating into the interior portion of the tire. The above characterizes the essentials of the second type of the conventional tires having the steel cord breaker.

The fact that the steel cord breaker is effective to improve to a certain extent the cut resistant property of the tire in the case of, for example, reducing occurrence of punctures of tires for automobiles in general by nails has been well known in the art.

It has been found out, however, that the steel cord breaker as applied to the pneumatic tire for off-road vehicles is not effective to improve the cut resistant property under certain service condition, that the premature separation failure is induced in the steel cord breaker, and that any improvement in the overall durability of the tire could not be obtained.

This is due to the property inherent to the reinforcing element formed of steel cord.

For ease of correctly understanding the present invention, the inventors' recognition derived from experimental results on the general mechanism for occurring the damages due to cuts in the pneumatic tire for off-road vehicles will now be described.

The damage due to cuts mainly occur in the following two types. In the first type, cuts occur at the tread rubber surface and is penetrated into the interior portion of the tire as shown in FIG. 1A. In the second type, cuts do not occur at the tread rubber surface, but occur within the tread layer as shown in FIG. 1B or occur within the breaker layer as shown in FIG. 1C.

The first type of cuts shown in FIG. 1A occur when the tire rides on obstructions such as sharp rocks, pieces of metal and glass, stubs, wooden blocks and the like and the obstructions are penetrated from the tread surface into the carcass as if a sharp knife edge of a cutting tool were penetrated from the tread surface into the carcass.

That is, the maximum strain position is moved from the tread surface and propagated in succession into the carcass in response to cuts of the rubber.

The second type of cuts shown in FIGS. 1B and 1C occur when the tire rides on an obstruction having a relatively large angle or round corners. In this case, the maximum strain or stress is located within the tread layer (FIG. 1B) or breaker layer (FIG. 1C) where the initial breakage occurs and becomes grown and developed.

As seen from the above, the first and second types of cuts are different in the generating mechanism from each other owing to difference in sharpness of the angles of obstructions and hence owing to difference in the locally concentrated position of the initial strain.

In addition, there are other cuts which are similar to the above mentioned second type of cuts. This is a phenomenon in which the initial cuts occur in the breaker layer or carcass ply layer when the tire while rotating at a high speed collides with obstructions having a relatively large angle or round corners.

The cut generating mechanism until this stage is similar to that described with reference to FIG. 1C. But, in this cut mechanism, if the tire rotating at the high speed collides with the obstructions, the tire is rapidly deformed to increase dynamic spring constant of the tire as a whole and reduce the shock absorbing faculty of the tire. As a result, the energy produced due to the collision is locally concentrated into the tire, that is, the maximum local strain becomes considerably large. The high deformation speed causes the tread rubber to considerably increase its viscosity and hence modulus of elasticity. As a result, the strain distributing condition becomes changed to concentrate the maximum strain position into the breaker layer or carcass ply layer. Thus, the cord of the breaker layer or of the carcass ply layer reaches to its breaking point, resulting in cord cut failure and further in shock burst failure.

In general, this failure is distinguished from the cut failure and will hereinafter be described in accordance with such conventional practice. The mechanism in which this failure occurs, however, is similar to that of the cut failure.

In the specification, therefore, the term cuts of the tire to be prevented by the present invention shall be understood to include,
(1) cuts at the tire surface,
(2) cuts in the tire interior portion, and
(3) cord cuts or tire shock burst.

As described above, the conventional steel cord breaker has the disadvantage that the cut resistant property could not be improved under certain service conditions as above described, and that there occurs separation failure at a relatively early time, and as a result, the overall durability of the tire could not be improved. This fact will now be described with reference to the above mentioned cut generating mechanism.

The penetration of the surface cut into the interior part of the tire can tentatively be checked by a steel breaker layer since its steel cord has a sufficiently high tensile strength.

But, if the interior cut or cord breakage or shock burst occurs, stress is liable to be concentrated into the steel cords since the tensile modulus of elasticity of the steel cord is far greater than that of the tread rubber or organic fiber cord of the carcass ply. In addition, the elongation at breaking strength of the steel cord is about 0.08 to 0.11 times smaller than that of the organic fiber cord of the carcass ply, so that the steel cord becomes easily broken.

That portion of the steel cord which has prematurely been broken induces premature separation, and as a result, the overall durability of the tire could not be improved.

A steel cord having extremely high tensile and compressive modulus of elasticity results in a pneumatic tire for off-road vehicles having the following disadvantage.

(1) Separation is liable to occur.

For example, when the tire is applied with an internal pressure or rotated under load, the amount of displacement of the steel cord relative to the surrounding rubber becomes different, so that the separation is liable to occur at end edges of the steel cord and any other portions.

(2) Cords are liable to be broken.

When the tire is rotated under load, the breaker cord is subjected to an axial compressive force. Such an axial compressive force could not be absorbed by the steel cord owing to its high compressive modulus of elasticity, and as a result, the steel cord becomes frequently collapsed, repetition of which causes the breaker cord to be broken.

(3) Acceleration of tread cut abrasion.

The steel cord breaker causes the tire crown portion to increase its bending rigidity, so that enveloping power of the tire, that is, that faculty of the tire which is effected when the tire rides on small obstructions on ground to surround them with the tread rubber, is reduced, and as a result, the tire is subjected to a number of small and intermediate cuts to increase abrasion due to cuts that tends to wear away the surface of the tread rubber in succession.

In short, the reinforcing element constituting the cut protective layer of the pneumatic tire for rough ground use is required to have the following properties:
(1) tensile strength which is necessary and sufficient to perform cut protective effect,
(2) elongation at breaking strength which is necessary and sufficient to perform protective effect against "all types of cuts", and
(3) tensile-compressive modulus of elasticity within a range which does not accelerate separation and tread cut abrasion and does not occur "cord breakage".

As seen from the above, the cut protective layer of both the WUT tire proposed as the first type of the conventional tire and composed of metallic filament having a length on the order of 10 mm and the steel cord breaker tire proposed as the second type of the conventional tire and formed by twisting together a plurality of elongate steel filaments are not suitable as the cut protective layer of the pneumatic tire for off-road vehicles.

The invention is directed to provide a third type of reinforcing element suitable as the cut protective layer of the pneumatic tire for off-road vehicles.

After search of such third type of reinforcing element, the inventors have studied the helically formed filaments described in U.S. Pat. No. 3,682,222.

As described in detail in the above U.S. patent specification, the helically formed filaments have been developed as the belt material for the radial tire or the belted bias tire. As far as the helically formed filaments possess the inherent ability to act as the tension supporting members in the circumferential direction of the tire, the helically formed filaments are substantially inextensible and similar to the above mentioned second type of steel cord breaker. As a result, even though the helically formed filaments per se are applied to the tire as its cut resistant layer, particular effects could not be expected.

The inventors' experimental tests effected for the purpose of obviating all of the disadvantages which have been encountered with the conventional tire have yielded the result that the use of "a bundle of helically formed filaments" assembled together without twisting as the third type of reinforcing element so as to obtain elongation at breaking strength which is necessary and sufficient for the cut protective layer of the pneumatic tire for off-road vehicles ensures a significant improvement in the overall durability of such kind of pneumatic tire.

The construction and effect of such bundle of helically formed filaments will now be described.

As the reinforcing element, a cord may be used composed of a bundle of 2 to 50, preferably 3 to 30 of relatively thin filaments each having a diameter of 0.1 mm to 1.0 mm, preferably 0.13 mm to 0.5 mm and formed by merely assembling together without twisting them together and without binding them together by means of exterior binding wires, each filament being formed of a material having the following range of tensile strength and helically formed in a resilient and permanent manner.

The helically formed filament may be formed of steel and other metals having a high cut resistant property or glass or organic materials. The material such as nylon, rayon and the like used usually as the tire cord and having tensile strength on the order of 80 Kg/mm² to 110 Kg/mm² is substantially unsuitable as the cut resistant material. It has been found out that the cut resistant material may be of one having a tensile strength of at least 140 Kg/mm², preferably at least 170 Kg/mm² and at least 200 Kg/mm² when a maximum cut resistant property is required.

This value of tensile strength is a minimum value which is necessary for checking the growth and penetration of the cuts started from the tread surface by the breaker layer and necessary for preventing the cord cuts and tire shock burst.

The elongation at breaking strength of the reinforcing element composed of the bundle of helically formed filaments, which is the most important characteristic thereof, is required to be at most 1.7 times, preferably 1.4 times that of the organic fiber cord of the carcass.

This is because of the fact that if the elongation at breaking strength of the reinforcing element exceeds 1.7 times that of the organic fiber cord of the carcass, the carcass cord arrives at its breaking point before the reinforcing element of the breaker reaches its breaking point, thereby refraining the breaking point of the reinforcing element from being moved therein.

The minimum elongation at breaking strength of the reinforcing element of the breaker is required to be at least 0.15 times, preferably at least 0.25 times that of the organic fiber cord of the carcass. This corresponds to an elongation at breaking strength which is 2 to 3 times larger than that of the conventional steel cord and could not be obtained by a steel cord formed by twisting together steel wires.

The cuts locally occur at any place on the tire crown portion and the number of occurrences of the cuts is different in dependence with that place on the tire crown portion where the cuts occur. The range within which the stress and strain occur due to the cuts are limited to a relatively local region, and as a result, the above mentioned elongation at breaking strength of the reinforcing element in the cut protective layer must be satisfied at any local position of the tire. Thus, the above mentioned elongation at breaking strength is defined such that it is obtained per a length of 25 mm of the reinforcing element.

The above mentioned elongation at breaking strength and modulus of elasticity may be obtained by a diameter $\phi$ of the helically formed filament, an average diameter D projected on a plane perpendicular to the axial direction of one pitch of the helically formed filament and a pitch thereof as defined in the following way.

In FIG. 2A a side elevation of the helically formed filament is shown and in FIG. 2B a helix delineated by one pitch of the helically formed filament shown in FIG. 2A is portrayed. The ideal shape of the helix delineated by one pitch of the helically formed filament should be a true circle for the purpose of equalizing the stress subjected to it. It has been found out that if a ratio of a maximum diameter (Dmax) of the helix to a minimum diameter (Dmin) thereof lies within a range to be described later, the stress subjected to the helix becomes substantially uniformly distributed, and that hence the premature fatigue breakage is not induced. For this purpose, in FIG. 2B, a ratio of the maximum diameter Dmax to the minimum diameter Dmin, that is, Dmax/Dmin is required to lie within range of 1 to 1.5.

In addition, the inventors have found that an average diameter D, that is, $$\frac{D_{max} + D_{min}}{2},$$

of the helix delineated by the helically formed filament should be $2\phi$ to $20\phi$, preferably $3\phi$ to $15\phi$, $\phi$ being the diameter of the helically formed filament.

As a method of obtaining a desirous elongation of the breaker without twisting together filaments each formed of material having a high tensile strength, for example, high carbon steel, it might be conceived to arrange undulate filaments in parallel with each other in one same plane. In this case, however, stress becomes concentrated into bent portions of the undulate filament in response to extension and compression in the lengthwise direction thereof. In addition, this stress is a bending stress to be concentrated into a part of the cross section of the helix delineated by the filament, so that there frequently occurs the premature fatigue breakage at the bent portions of the filament. As a result, it has been found that the measures described could not be used in practice.

On the contrary, the use of the helically formed filament ensures a necessary elongation. In this case, the stress produced in response to the extension or compression in the lengthwise direction of the helically formed filament is substantially uniformly distributed over any portion in the lengthwise direction thereof. In addition, the above mentioned stress is a torsional shearing stress which is easily distributed in a relatively uniform manner over the cross section of the filament, so that it is possible to completely prevent the fatigue breakage.

Experimental tests have yielded the result that if helically formed filaments formed of steel are used as a reinforcing element of a cut protective layer, the cut resistant property of the tire depends upon the overall cross sectional area of those filaments which are included in the cut breaking surface, but does not depend upon each cross sectional area of respective filaments. As a result, it might be desirous to use filaments which are least possibly small in diameter. But, the use of a filament whose diameter $\phi$ is smaller than 0.1 mm results in occurrence of cuts of the filaments in non-allowable frequency in the step of shaping the helically formed filament.

On the contrary, if use is made of a filament whose diameter $\phi$ is larger than 1.0 mm, internal stress produced in the filament during the step of shaping the helically formed filament becomes excessively large. In addition, torsional shearing stress, which occurs when extension or compression is subjected to the filament in its lengthwise direction, is concentrated into the helix delineated by the filament. As a result, the overall cross sectional area required for maintaining the strength which is sufficient to resist against the same exterior force becomes larger than that necessary for the thin filament, thereby requiring a large amount of material. As a result, the use of the filament having a diameter larger than 1.0 mm is not economical.

As seen from the above, the diameter $\phi$ of the filament is required to lie within a range from 0.1 to 1.0 mm.

The relation between the diameter $\phi$ of the filament and the average diameter D of the helix delineated by one pitch of the helically formed filament will now be described. If D is smaller than $2\phi$, the pitch of the helically formed filament is required to be excessively small for the purpose of obtaining the desired elongation. As a result, the cuts of filaments frequently occurs in nonallowable frequency in the same manner as in the case of using the filament whose diameter is excessively small. At the same time, the internal stress produced when the filament is helically formed becomes excessively large.

On the contrary, if D is larger than $2\phi$, the transverse distance between the most protruded portions of two adjacent helically formed filaments arranged in the tire as its reinforcing element becomes too small to define that distance therebetween which is required for maintaining the desired separation resistant property, and as a result a, sufficiently large cut resistant property could not be obtained. On the contrary, if it is desired to obtain the sufficiently high cut resistant property, the transverse distance required between the two adjacent elements could not be obtained, so that a sufficiently high separation resistant property could not be obtained. In addition, in order to obtain the sufficiently high separation resistant property, not only the transverse distance required between the two adjacent helically formed filaments, but also the distance between the tread rubber and the reinforcing element and the radial distance between the reinforcing element and the carcass in the case of one rubberized layer containing the reinforcing element are required to be kept within a certain range. In addition, in the case of at least two rubberized layers, the radial distance between the two radially adjacent reinforcing elements must also be kept within a certain range. Moreover, the above mentioned distance is required to be measured between the most protruded portions of the two adjacent reinforcing elements, so that it is necessary to use for example a thick rubberized layer containing the reinforcing element embedded therein, thereby significantly impeding economy. As seen from the above, the average diameter D projected on a plane perpendicular to the axial direction of one pitch of the helically formed filament should be 2 to 20 times larger than the diameter $\phi$ of the filament.

The pitch of the helically formed filament is suitably selected in association with modulus of elasticity of the filament, diameter $\phi$ of the filament and average diameter D of the helix delineated by one pitch of the helically formed filament for the purpose of obtaining optimum elongation at breaking strength and modulus of elasticity required for the use of the tire.

The number of helically formed filaments adapted to be assembled together without twisting so as to provide the reinforcing element will now be described. If use is made of one helically formed filament, the diameter $\phi$ thereof becomes excessively large for the purpose of obtaining the required cut resistant property of the tire. As a result, the above mentioned problem is generated and at the same time the effect of improving reinforcing element-to-rubber bonding force will be decreased. On the contrary, if use is made of more than 50 helically formed filaments, the diameter projected on a plane perpendicular to the axial direction of one pitch of the helically formed bundle becomes excessively large even though care is taken to make the average diameter D thereof small. As a result, the same problem occurs as in the case of making the average diameter D excessively large. As seen from the above, the number of helically formed filaments adapted to be assembled together without twisting at random to provide the reinforcing element is suitably selected into a range between 2 and 50, preferably, 3 to 30, by balance between the cut resistant property and other characteristics required for the use of tires on the one hand and economy on the other hand into consideration.

The relation between the force subjected to the reinforcing element constructed as above described according to the invention and to a conventional stranded steel cord on the one hand and elongations thereof on the other hand will now be described with reference to a practical example.

FIG. 3 shows tensile test results with the force in Kg/cord or Kg/bundle taken on ordinate and with the elongation in % on abscissa. In FIG. 3, the dotted lines curve $\alpha$ shows a tensile test result yielded from a conventional steel cord having a strand construction of $1 \times 5$, filament diameter $\phi$ of 0.25 mm and cord diameter of 0.68 mm and full line curves $\beta$ and $\gamma$ show tensile test results yielded from reinforcing elements according to the invention. The tensile test result shown by the full line curve $\beta$ was obtained from a reinforcing element composed of a bundle formed of 5 filaments according to the invention each having a filament diameter $\phi$ of 0.25 mm, average diameter D of the helix delineated by one pitch of the filament of 0.95 mm, (Dmax/Dmin)=1.25, (D/$\phi$)=3.8, and pitch of 10.5 mm. The tensile test result shown by the full line curve $\gamma$ was derived from a reinforcing element composed of a bundle of 14 filaments according to the invention each having a filament diameter $\phi$ of 0.175 mm, average diameter D of the helix delineated by one pitch of the filament of 1.1 mm, (Dmax/Dmin)=1.20, (D/$\phi$)=6.3 and pitch of 11 mm. In FIG. 3, the dotted lines curve $\delta$ shows a tensile test result yielded from a conventional nylon cord.

As seen from FIG. 3, the reinforcing elements according to the invention provide the ideal relation between the force subjected to the reinforcing elements and the elongation thereof, which relation being usable for the cut protective layer for the pneumatic tire for off-road vehicles.

As rubber which constitutes together with the reinforcing element the cut protective layer, use may be made of a rubber compound having a hardness defines by JIS K 6301 which makes use of a spring type hardness test (A type) at room temperature of 50° to 85°; 300% modulus of elasticity of 100 to 250 Kg/cm$^2$; tensile strength of 150 to 250 Kg/cm$^2$; and tensile strength at 100° C. of 75 to 160 Kg/cm$^2$. In order to further improve the separation resistant property of the tire, it is preferable to use rubber having a higher modulus of elasticity within the above mentioned range as that rubber which is located near the reinforcing element and rubber having a lower modulus of elasticity within the above mentioned range as that rubber which is located outside the above mentioned rubber. That is, the rubber layer is of two layer construction in which the modulus of elasticity thereof is changed in a stepwise manner.

In the case of adopting one rubber layer, it is preferable to use rubber having a lower modulus of elasticity within the above mentioned range for the pneumatic tire adapted for use in heavy load, low speed and short life vehicles such as a loader and the like and use rubber having a higher modulus of elasticity within the above mentioned range for the pneumatic tire adapted for use in relatively light load, high speed and long life vehicles such as a dump truck, scraper and the like. More particularly, it is advisable for end edges of the reinforcing element to use rubber having a high modulus of elasticity.

As described above, the reinforcing element composed of a bundle of helically formed filaments according to the invention is extremely easily deformable so as to reduce the amount of relative displacement between the rubber and the reinforcing element. As a result, it is possible to reduce separation at the end edges of the reinforcing element. In addition, the helically formed filaments for constituting the reinforcing element are not twisted together as in the case of the steel cord, but are merely assembled together at random to provide a bundle. Thus, it is possible to sufficiently penetrate the rubber into gaps formed between the filaments and the mechanical bonding force can compensate for insufficient reinforcing element-to-rubber chemical bonding.

The use of the reinforcing element composed of a bundle of helically formed filaments according to the invention ensures a significant reduction of the compressive modulus of elasticity of the reinforcing element, so that the reinforcing element can absorb the compressive force instantaneously subjected thereto without repeating collapses, thereby significantly decreasing occurrences of the cord breakage.

The difference between the compressive modulus of elasticity and compressive fatigue property of the reinforcing element according to the invention and those of the conventional stranded steel cord for tires will now be described with reference to practical examples.

In FIG. 4 are shown compression test results. In FIG. 4 the compressive force in Kg is plotted on the ordinate and the compressive strain in % is plotted on the abscissa. In this test, use was made of two test pieces, one of which being composed of a cylindrical rubber containing one conventional stranded steel cord embedded therein and the other being composed of a cylindrical rubber containing one bundle according to the invention embedded therein.

In FIG. 4, a dotted lines curve $\alpha$ shows the relation between the compressive force in Kg subjected to the conventional stranded steel cord having a construction of 1×5, filament diameter $\phi$ of 0.25 mm and cord diameter of 0.68 mm and the compressive strain in % produced therein. A full line curve $\beta$ shows the relation between the compressive force in Kg subjected to the reinforcing element according to the invention composed of 5 filaments each having a diameter $\phi$ of 0.25 mm and average diameter D of the helix delineated by the filament of 0.95 mm, (Dmax/Dmin)=1.25, (D/$\phi$)=3.8 and pitch of 10.5 mm and the compressive strain in % produced therein.

In FIG. 4, a dotted line curve $\epsilon$ shows the same relation with respect to the test piece formed of rubber only. The rubber of all of these three test pieces is of the same rubber compound.

As seen from FIG. 4, the compressive modulus of elasticity of the reinforcing element according to the invention is extremely small, the value being near to a value of the rubber specimen.

In FIG. 5 is shown compressive fatigue test result. A percentage of tensile strength remained after the tensile strength has been applied to a new tire, i.e. tensile strength holdability in % is plotted on the ordinate and number of strains repeatedly occurred is plotted on the abscissa. In the present test, use was made of two test pieces, one being composed of a rectangular rubber body containing a plurality of conventional stranded steel cords embedded therein and the other being composed of a rectangular rubber body containing a plurality of bundles according to the invention embedded therein, and these two test pieces were subjected to 5% repeating compressive strain in an intermittent manner.

In FIG. 5, a dotted line curve $\alpha$ shows strong force holdability as a function of the number of strains repeatedly occurred for the conventional stranded steel cord having a strand construction of 1×5, filament diameter $\phi$ of 0.25 mm and cord diameter of 0.68 mm and a full line curve $\beta$ shows a relation similar to the dotted lines curve $\alpha$ for the reinforcing element according to the invention composed of five filaments each having a filament diameter $\phi$ of 0.25 mm, average diameter D of the helix delineated by the filament of 0.95 mm, (Dmax/Dmin)=1.25, (D/$\phi$)=3.8 and pitch of 10.5 mm. As seen from FIG. 5, the tensile strength holdability of the reinforcing element according to the invention is far superior to that of the conventional steel cord.

The breaker according to the invention constructed as above described is not inextensible nor highly rigid contrary to the conventional steel cord breaker, but is flexible and extensible and has a significantly high enveloping power, thereby effectively alleviating cut abrasion which causes the rubber to be abraded due to cuts.

The arrangement of the reinforcing element composed of a bundle of helically formed filaments according to the invention will now be described.

In accordance with the invention, use may be made of at least one rubberized layer containing reinforcing elements embedded therein. The reinforcing element is inclined 20° to 70°, preferably 30° to 55° with respect to the equatorial line of the tire. At least two above mentioned rubberized layers may be used in order to further effectively protect the tire from becoming subjected to cuts. In this case, it is preferable to extend the reinforcing elements associated with one of these layers in an opposite direction to the reinforcing elements associated with the other layer so as to provide a cut protective layer having reinforcing elements arranged in meshes of a net.

The axis of the helically formed filament is also inclined 20° to 70°, preferably 30° to 55° with respect to the equatorial line of the tire.

In one embodiment of the invention, the cut protective layer is constructed as above described, that is, the breaker is disposed between the tread rubber layer and the carcass layer. But, the cut protective layer may also be disposed within the tread rubber layer and at that part between carcass ply layers which is near the tread.

The widthwise position of the cut protective layer according to the invention may suitably be selected as is required by the side cut resistant property. The cut protective layer may continuously be extended from one of beads to another bead. In addition, the cut protective layer may suitably be divided in its widthwise direction into any number of sections which are spaced apart from each other.

In addition, use may be made of at least one rubberized layer containing cords composed of organic fiber such as nylon and the like embedded therein. Such a rubberized layer will hereinafter be called as an additional layer. At least one such additional layer may be superimposed about the breaker layer having the cut protective faculty according to the invention over a width which is wider than the width of the breaker or may be superimposed about each side edge only of the breaker layer, thereby improving recap property of the tire.

The organic fiber cord usable for the carcass ply and the above mentioned additional protective layer may be formed of nylon, rayon, vinylon (polyvinyl alcohol), polyester and the like. The helically formed filament constituting the reinforcing element of the breaker may be formed of metallic filament per se or metallic filament treated so as to improve rubber-to-filament bonding property, for example, brass plated steel filament or aromatic polyamide having a high modulus of elasticity, glass fiber and the like.

The use of the above mentioned reinforcing element as the breaker layer ensures the following effect.

(1) The reinforcing element has elongation at breaking strength within a range which is necessary and sufficient with respect to the elongation at breaking strength of the carcass cord and hence exhibits a significantly excellent cut resistant property for all types of cuts.

(2) The reinforcing element is composed of a cord of helically formed filaments which gives necessary elongation. In this case, the stress caused by extension or compression in the lengthwise direction of the filament is substantially uniformly distributed over any portions thereof in its lengthwise direction. In addition, this stress is torsional shearing stress which is liable to be distributed in a relatively uniform manner, and as a result, it is possible to completely prevent fatigue breakage.

(3) The reinforcing element is liable to be deformed in an extremely easy manner so as to reduce the amount of relative displacement between the rubber and the reinforcing element, so that separations occurring at the end edges and any other portions of the reinforcing element can be reduced. In addition, the bundle of filaments for constituting the reinforcing element is formed by merely assembling 2 to 50 filaments together at random without twisting together these filaments as in the case of the conventional steel cord. As a result, a sufficient amount of rubber can be penetrated into gaps formed between the filaments of the bundle, so that insufficient chemical rubber-to-filament bonding force can sufficiently be compensated by the mechanical bonding force, thereby exhibiting an excellent separation resistant property.

(4) The reinforcing element has a considerably low compressive modulus of elasticity and hence can absorb instantaneously acting compressive forces, and as a result, there is no risk of the reinforcing element being repeatedly collapsed, thereby significantly reducing occurrence of "cord breakage".

(5) The breaker layer which makes use of the reinforcing element is not inextensible and not highly rigid, but is flexible and highly extensible, and as a result, the breaker layer has a considerably large enveloping power. Thus, abrasion due to cuts that tends to wear away the surface of the tread rubber in succession can effectively be reduced.

As seen from the above, the reinforcing element composed of a bundle of helically formed filaments and having a necessary and sufficient elongation at breaking strength exhibits extremely excellent cut resistant property for all types of cuts and at the same time can obviate all of the disadvantages which have been encountered with the conventional cut resistant tire, thereby significantly improving the overall durability of the such tire.

The inventors have found out that the above mentioned third type of tire has disadvantages under certain service conditions. That is, if the tire is used for a relatively long time, the separation resistant property thereof becomes degraded.

An object of the invention, therefore, is to provide a pneumatic tire for off-road vehicles, which can obviate all of the disadvantages which have been encountered with the conventional tire and can not only improve the cut resistant property which is the most important for such kind of tire but also improve the separation resistant property and the wear resistant property both of which are also important for the above mentioned kind of tire.

Another object of the invention is to provide a pneumatic tire for off-road vehicles, which has an overall cut resistant property for all types of cuts together with an excellent separation resistant property.

A feature of the invention is the provision of a pneumatic tire for off-road vehicles, comprising A. a carcass body
 a. composed of a plurality of rubberized ply layers superimposed one upon the other and each containing organic fiber cords embedded therein, and
 b. having a so-called bias construction in which the cords of approximately one-half of the carcass ply layers are extended in an opposite direction to the cords associated with the remaining carcass ply layers, and B. a breaker
 a. superimposed about said carcass body and composed of at least one rubberized layer each containing reinforcing elements embedded therein and composed of a bundle formed by merely assembling helically formed filaments together without twisting,
 b. the reinforcing elements being formed of material having tensile strength of at least 140 Kg/mm$^2$, and
 c. having elongation at breaking strength which is 0.15 to 1.7 times that of the organic fiber cord of the carcass body, and the breaker layers as a whole being extensible.

In accordance with the invention in order to further improve the separation resistant property of the pneumatic tire for off-road vehicles, a ratio $\delta$ of a space formed between the two adjacent reinforcing elements to a pitch between the midlines of the reinforcing elements is given by $$\delta = \frac{S - (D + d - \phi)}{S};$$

preferably, 0.17 to 0.78, where S is a pitch between mid-lines of the two adjacent reinforcing elements in mm, D is an average diameter projected on a plane perpendicular to the axial direction of one pitch of a helically formed filament in mm and d is a bundle diameter in mm which is given by $1.25 \times \sqrt{N} \times$ filament diameter $\phi$ where N is the number of filaments for constituting the reinforcing element and the coefficient 1.25 is a function of a standard density.

The invention will now be described in greater detail with reference to the accompanying drawings, wherein.

Figure 7A:
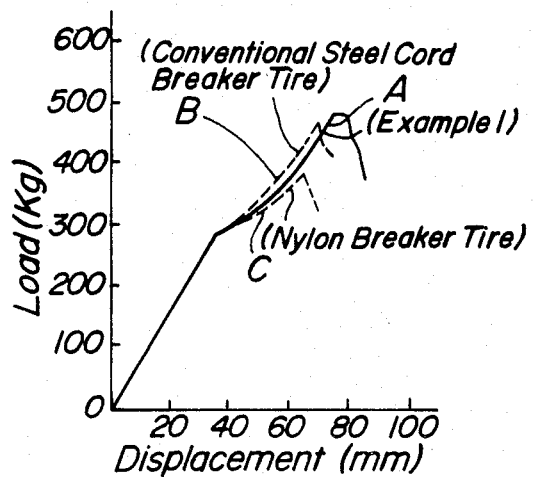
FIG. 7A is a graph illustrating test results of cut resistant property of the tire shown in FIG. 6 as compared with those of the conventional tires with the aid of a tapered cutter.
Figure 7B:
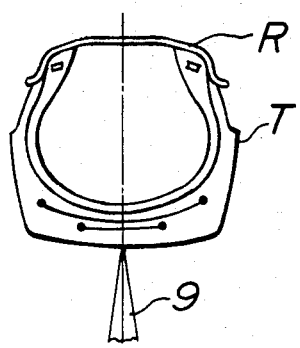
Figure 8A:
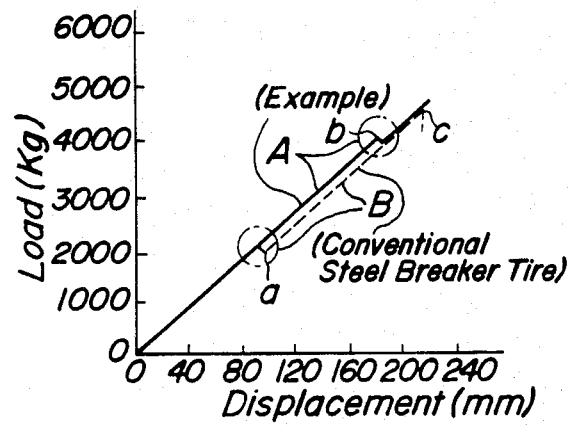
Figure 8B:
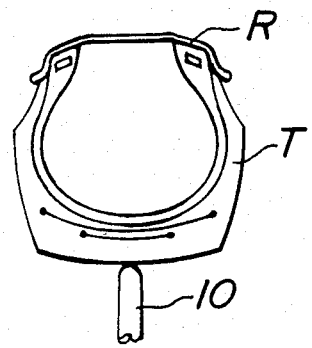
Figure 9:
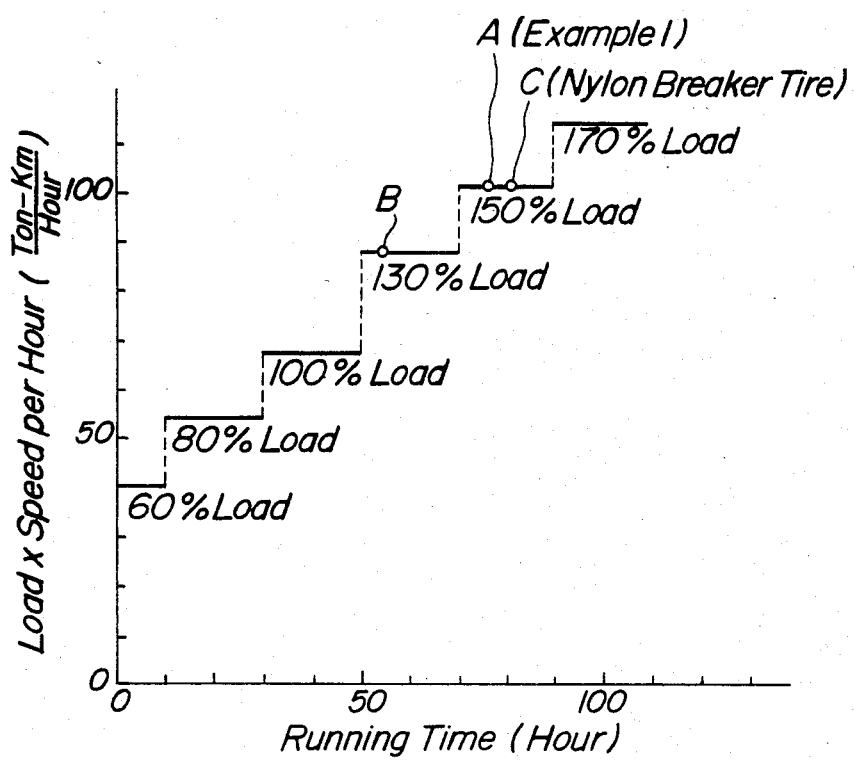
Figure 10:
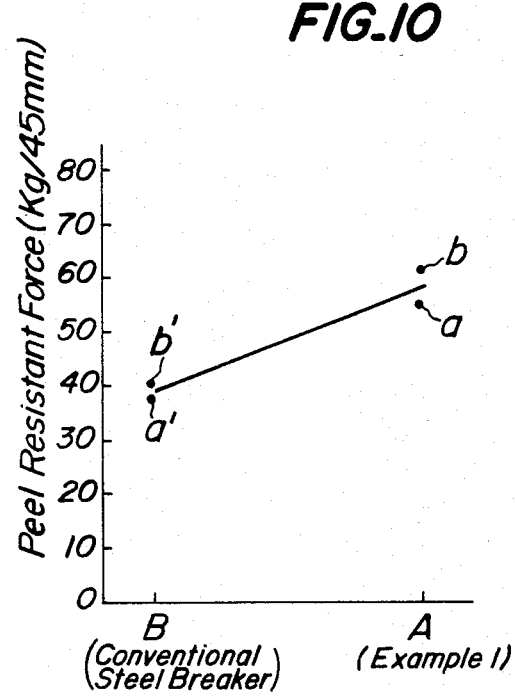
Figure 11:
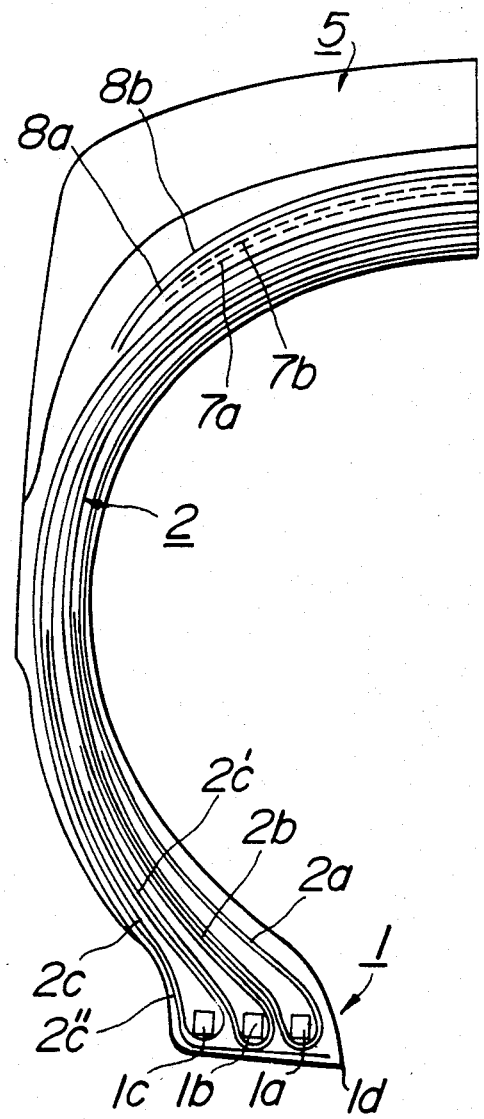
Figure 12A:
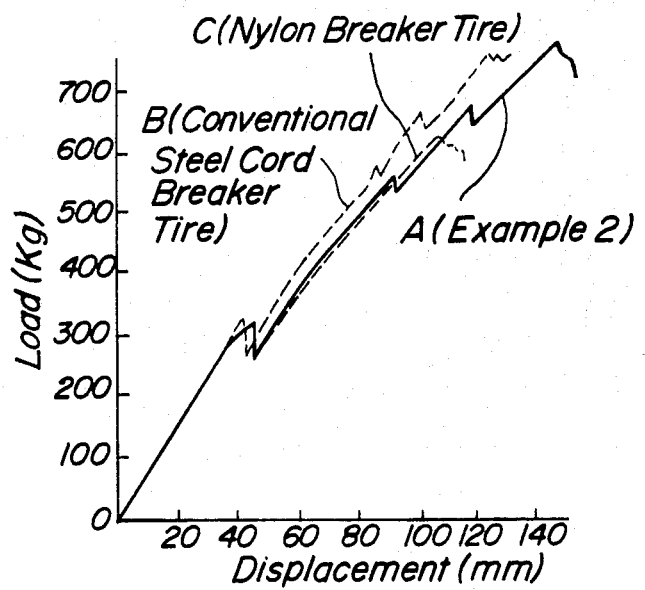
Figure 12B:
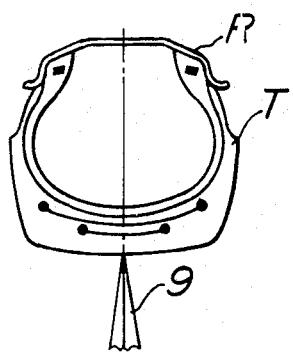
Figure 13A:
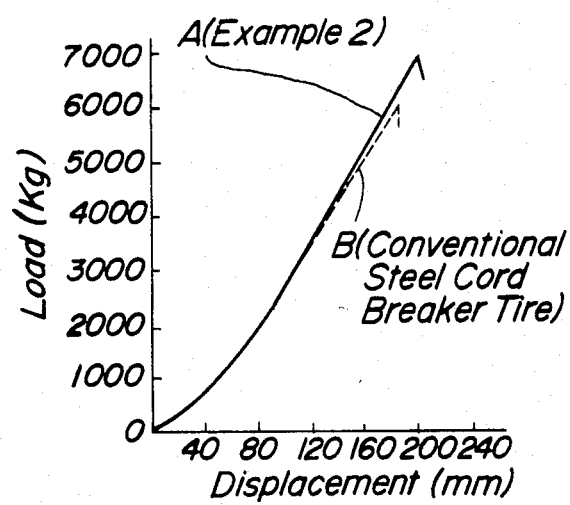
Figure 13B:
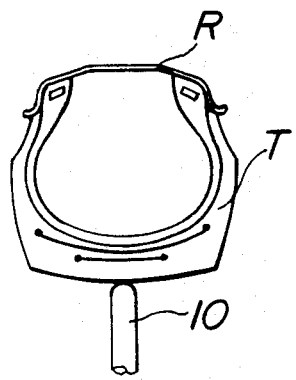
Figure 14:
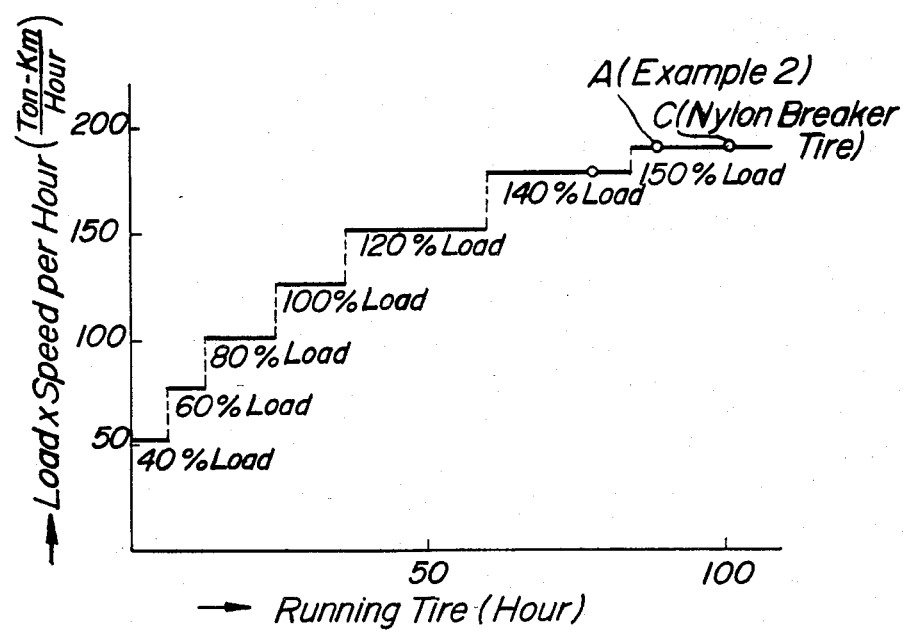

FIG. 7B schematically illustrates the tapered cutter urged against a tire to be tested;

FIG. 8A is a graph illustrating test results similar to those shown in FIG. 7A with the aid of a cylindrical plunger;

FIG. 8B schematically illustrates the cylindrical plunger urged against a tire to be tested;

FIG. 9 is a graph illustrating test results of separation resistant property of the tire of the example 1 according to the invention as compared with those of conventional tires;

FIG. 10 is a graph illustrating peel resistant property of the tire of the example 1 according to the invention as compared with that of the conventional steel breaker tire;

FIG. 11 is a cross-sectional view showing one-half of a tire of example 2 according to the invention, parts being shown vertical center section through the rotational axis of the tire;

FIG. 12A is a graph illustrating test results of cut resistant property of the tire shown in FIG. 11 as compared with those of the conventional tires with the aid of a tapered cutter;

FIG. 12B schematically illustrates the tapered cutter urged against a tire to be tested;

FIG. 13A is a graph illustrating test results similar to those shown in FIG. 12A as compared with those of the conventional tires with the aid of a cylindrical plunger;

FIG. 13B schematically illustrates the cylindrical plunger urged against a tire to be tested;

FIG. 14 is a graph illustrating test results of separation resistant property of the tire of the example 2 according to the invention as compared with those of the conventional tires; and FIGS. 15 to 23 are cross-sectional views showing various modified embodiments of the tire according to the invention, parts being shown vertical center section through the rotational axis of the tire.

As described above, the reinforcing element composed of a bundle of helically formed filaments according to the invention can be deformed in an extremely easy manner. As a result, it is possible to reduce the amount of relative displacement between the rubber and the reinforcing element. In addition, the reinforcing element is composed of a cord of helically formed filaments formed by merely assembling 2 to 50 filaments together without twisting at random without twisting together contrary to the conventional steel cord formed by twisting together steel filaments. As a result, the rubber can easily be penetrated into the gaps formed between the filaments and hence the rubber-to-reinforcing element bonding force is increased by adding the chemical bonding force to the mechanical bonding force. Thus, the separation resistant property of the reinforcing element according to the invention is far superior to that of the conventional steel cord.

The tire for off-road vehicles is subjected to heavy load under severe service conditions which surpasses that limit of the rubber-to-reinforcing element bonding force which is determined by the manufacturing condition of such tire on the mass production scale even if the reinforcing element is composed of a cord of helically formed filaments. As a result, if the tire is used for a relatively long time and hence repeatedly subjected to strain, the rubber near the reinforcing element or the bond of rubber-to-reinforcing element becomes slightly broken, which minute damage becomes larger and develops into separation failure.

Realizing that the tire for off-road vehicles is subjected to heavy loads and used under severe conditions and that even if the separation resistant property of the tire is increased, its limit is often surpassed, the invention is directed to increase the rubber-to-reinforcing element bonding force or the breakage resistant force of the rubber near the reinforcing element to such an extent that such an increase does not impede the economy of the manufacture on mass production scale, but to suppress the breakage to the least possible extent and prevent the growth of the breakage.

In order to attain such effect, in accordance with the invention, a ratio of a space formed between two adjacent elements to a pitch between midlines of the reinforcing elements is given by $$\delta = \frac{S - (D + d - \phi)}{S};$$

preferably, 0.17 to 0.78, where S is a pitch between midlines of two adjacent elements in mm, D is an average diameter of a helix delineated by one pitch of the helically formed filament in mm, d is a bundle diameter in mm which is given by $1.25 \times \sqrt{N} \times$ filament diameter $\phi$ where N is the number of filaments for constituting the reinforcing element and the coefficient 1.25 is a function of a standard density.

As seen from the above, the invention is capable of reducing the number of reinforcing elements embedded in the rubberized breaker layer.

When the tire is used for a long time, the reinforcing element becomes separated from the rubber of the breaker layer in the following order. In the initial stage, the rubber near the reinforcing element becomes broken or the rubber-to-reinforcing element bond becomes broken to induce minute local separation. In the second stage, these locally separated regions are interconnected with each other so as to induce continuously grown separation in the breaker layer or between these layers. The above fact was recognized by the result of the inventors' breakage acceleration tests effected on the pneumatic tires for off-road vehicles.

The above mentioned minute local separation in the initial stage is unavoidable for the tire for off-road vehicles under service condition, particularly under a relatively long time service condition as far as the use is made of the above mentioned reinforcing element having a high cut resistant property which limits its rubber-to-reinforcing element bonding force.

The inventors have found out that if the reinforcing elements are arranged in the breaker layer and spaced apart from each other by a relatively large distance, it is possible to prevent the minute local separations from becoming grown into a continuous separation, and that the use of the measures described ensures an effective prevention against separation failure.

In accordance with the invention, the ratio $\delta$ of the distance between the two adjacent elements to the distance between the midlines of these elements is made 0.11 to 0.78.

Experimental tests have shown that if $\delta$ exceeds 0.78, the effect of improving the cut resistant property could not be attained, and that if $\delta$ is smaller than 0.11, the shearing force produced in the rubber surrounding the reinforcing elements is rapidly increased and the very narrow space between the two adjacent elements causes the above mentioned initial breakage to rapidly grow and develop.

The distance S between the midlines of the two adjacent elements is derived on the basis of the average number of elements embedded in a length 100 mm of the rubberized breaker layer in a direction perpendicular to the lengthwise direction of the elements arranged in the crown center portion of the tire. The diameter d of the bundle of the filaments is derived from the above mentioned formula $d = 1.25 \times \sqrt{N} \times$ filament diameter $\phi$.

The carcass of the pneumatic tire for off-road vehicles according to the invention may be of a bias construction comprising a plurality of rubberized ply layers each containing an organic fiber cord embedded therein. The cords of the carcass are inclined 23° to 45° with respect to the equatorial line of the tire in accordance with the conventional tire which makes use of a carcass of a bias construction. In this case, the cords of approximately one-half of the plurality of carcass ply layers are required to be oppositely inclined to those of the other carcass ply layers.

In carrying out the invention, the cut preventive layer constructed as above described may be disposed between the tread rubber layer and the carcass layer. In dependence with the use of tires, the cut preventive layer may be embedded in the tread rubber layer or in that part of the carcass layer which is near the tread.

The cut preventive layer may suitably be extended in its widthwise direction without any limitation as is desired for the side cut resistant property of the tire. If necessary, the cut preventive layer may continuously be extended from one of the beads to another bead. In addition, the length of the cut preventive layer in its widthwise direction may be divided into several sections.

About the cut preventive layer may be superimposed at least one additional layer containing cords formed of organic fiber such as nylon and the like. Such additional layer may have a width which is wider or narrower than that of the cut preventive layer. The narrow additional layer may be superimposed about each side edge only of the cut preventive layer. The additional layer arranged as described above serves to improve the recap property of the tire.

A pneumatic tire adapted for use in construction vehicles according to the invention will now be described with reference to practical examples.

EXAMPLE 1

Figure 6:
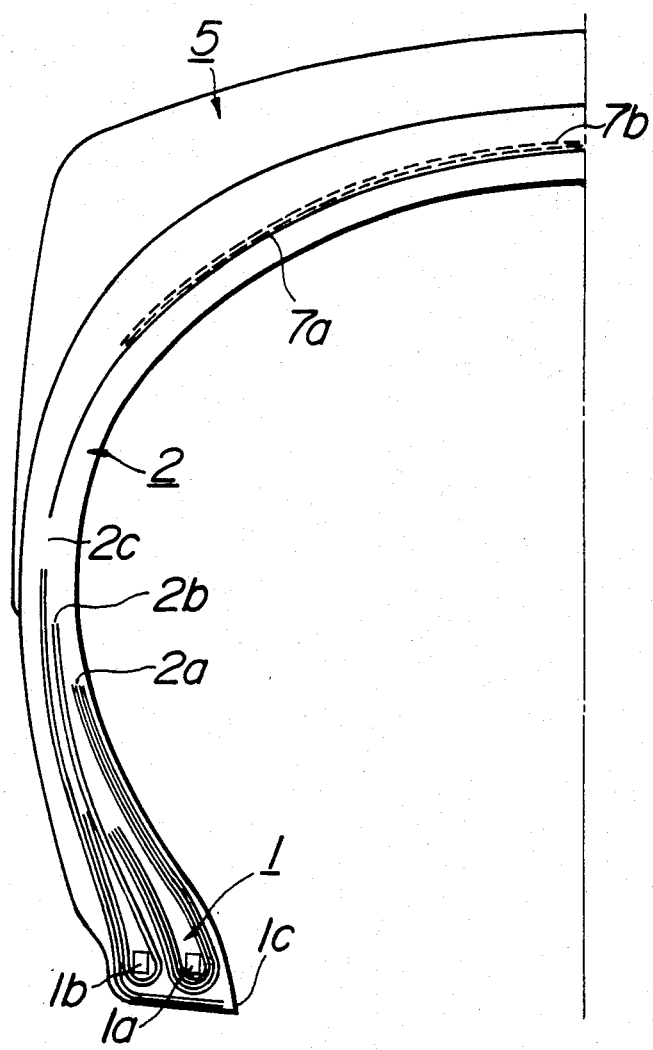
FIG. 6 is a cross-sectional view showing one-half of a tire of example 1 according to the invention, parts being shown vertical center section through the rotational axis of the tire.

In FIG. 6 is shown a cross section of one-half of a tire, parts being shown vertical center section through the rotational axis of the tire. The tire shown in FIG. 6 is of a third kind of tire for construction vehicles as defined by JIS D 6401, that is, a wide base tire having a regular tread and a size of 17.5-25 12PR, 12PR being indicated on the basis of cotton yarn.

The tire shown in FIG. 6a comprises a bead member 1 composed of two sets of bead cores 1a, 1b and a carcass ply 2 composed of 8 plies each formed of nylon cord of 1,260 denier/2 strands.

Four plies 2a of the total eight plies are wound about the bead core 1a from the inside toward the outside thereof and secured to the bead member 1. Similarly, two plies 2b of the total eight plies are wound about the bead core 1b from the inside toward the outside thereof and secured to the bead member 1. Finally, two outermost plies 2c are extended from the outside along the lower surface of the bead cores 1b, 1a toward the inside thereof and secured at their inner ends to a toe portion 1c of the bead member 1.

The cords of these carcass plies are disposed in each of the plies and extended along two directions symmetrically inclined at an angle of approximately 36° with respect to the equatorial line of the tire.

About these carcass plies 2 are superimposed two breaker layers 7a, 7b each composed of a bundle of helically formed filaments and extending in a crown portion 5 across substantially overall tread width. Each of these breaker layers 7a, 7b is composed of a rubberized fabric containing a bundle of 5 helically formed steel filaments and constituting a reinforcing element. Each filament has a diameter $\phi$ of 0.25 mm, average diameter D of a helix delineated by the filament of 0.95 mm, (Dmax/Dmin) = 1.25, (D/$\phi$) = 3.8 and pitch of 10.5 mm. The number of the reinforcing elements per 100 mm of the rubberized fabric is approximately 32. These reinforcing elements are disposed in each of the rubberized layers and extended along two directions symmetrically inclined at an angle of approximately 36° with respect to the equatorial line of the tire.

Figure 3:
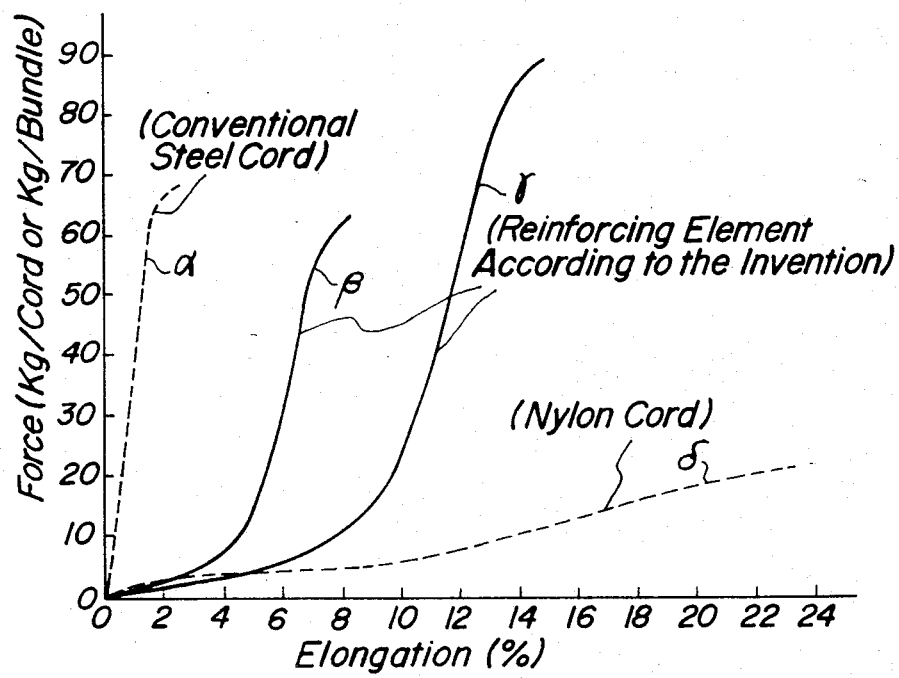
FIG. 3 is a graph illustrating tensile test results obtained from reinforcing elements according to the invention as compared with that yielded from a conventional steel cord.

This reinforcing element is the same as that having the test result shown by the curve $\beta$ in FIG. 3. The helically formed filament is formed of material having a tensile strength of 280 Kg/mm$^2$ and elongation at breaking strength which is 0.34 times that of the carcass cord. The ratio $\delta$ is 0.47.

Figure 1A:
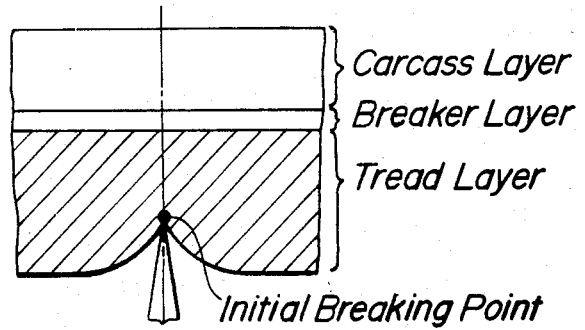
FIGS. 1A, 1B and 1C are fragmentary sectional views showing a tread layer, breaker layer and carcass layer of a tire and illustrating types of cuts.

Fig. 7A shows test results of the cut resistant property of the tire shown in FIG. 6 as compared with those of the conventional tires, all tires being subjected to the type of cuts shown in FIG. 1A.

In FIG. 7A, the load in Kg is plotted on the ordinate and the amount of displacement of a cutter in mm is taken on abscissa.

In order to obtain the experimental test results shown in FIG. 7A, a tire to be tested T shown in FIG. 7B was mounted on a standard rim R of 14.00×25 and pressurized to a standard internal pressure of 3.5 Kg/cm$^2$. The tire T was remained as it was for about 24 hours and then was mounted on Amsler's testing machine which makes use of a tapered sharp cutter 9 (FIG. 7B) and whose taper angle is approximately 15°, blade width is 60 mm. The cutter 9 was urged against the tire to be tested T with a speed of 50 mm/min as shown in FIG. 7B. The cut resistant property of the tire to be tested was observed with respect to the breaking load as a function of the amount of displacement of the cutter 9 into the tire T.

In FIG. 7A, a full line curve A shows the test result of the tire of the example 1 according to the invention. A dotted lines curve B shows the test result of the conventional steel breaker tire which makes use of stranded steel cord breaker layers, the steel cord being the same in material and sectional area as the reinforcing element of the example 1 according to the invention and having a strand construction of $1 \times 5$, filament diameter $\phi$ of 0.25 mm and cord diameter of 0.68 mm, the number of cords per unit length of the rubberized layer being the same as that of the example 1 according to the invention and the other structure being the same as that of the tire of the example 1 according to the invention. Another dotted line curve C shows the test result of a nylon breaker tire which makes use of two breaker layers each containing 34 nylon cords per 50 mm of the breaker layer, each nylon cord being composed of 840 denier/2 strands, and the other structure being the same as that of the tire of the example 1 according to the present invention.

As seen from FIG. 7A, the breaking energy in Kg·mm of the tire of the example 1 according to the invention shown by the full line curve A is superior to those of the conventional steel breaker tire and the nylon breaker tire shown by the dotted lines curves B and C, respectively. The breaking energy of the tire of the example 1 according to the invention shown by the full line curve A was approximately 12% larger than that of the conventional steel breaker tire shown by the dotted lines curve B.

In practice, cuts occur at random, so that the difference between the breaking energy of the tire according to the invention and the breaking energy of the conventional tire becomes considerably large at the service site where the tire is run on off-road.

Figure 1B:
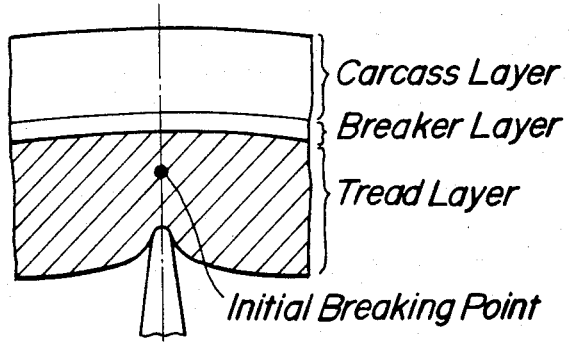
Figure 1C:
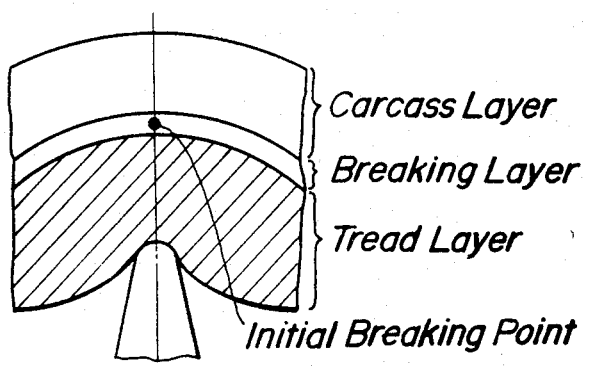
Figure 2A:
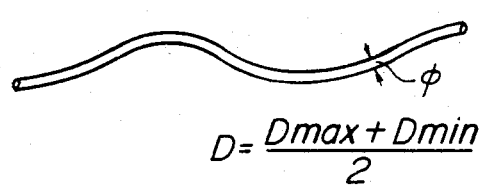
FIG. 2A is a side elevation of a helically formed filament for constituting a reinforcing element according to the invention.
Figure 2B:
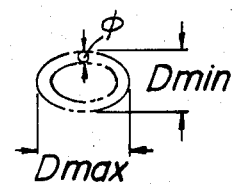
FIG. 2B is its end view showing a helix delineated by the filament shown in FIG. 2A.

FIG. 8A shows an improved cut resistant property of the tire shown in FIG. 6 against the cuts whose type is shown in FIGS. 1B and 1C.

In FIG. 8A, the load in Kg is taken on ordinate and displacement in mm is plotted on the abscissa.

The test was effected in the same manner as in the case shown in FIG. 7B by using a cylindrical plunger 10 having a diameter of 38 mm and provided with a semispherical front end instead of using the tapered sharp cutter 9 shown in FIG. 7B.

In FIG. 8A, curves A, B show the test results of the tire whose construction is just the same as that used for obtaining the test result shown in FIG. 7A. As shown by the dotted lines curve B, the steel breaker layer of the conventional tire was broken at a point a, while the breaker layer of the tire of the example 1 according to the invention was broken at a point b of the full line curve A which is far later than the point a of the dotted lines curve B. As seen from FIG. 8A, the invention is capable of improving the cut resistant property of the tire. As in the case of the test results shown in FIG. 7A, the difference of the cut resistant properties shown by the curves A and B becomes considerably large at the site of using the tire in practice. Both the tires were broken at a point c on the curves A, B where both the tires were penetrated through by the cutter 10 shown in FIG. 8B.

In FIG. 9 is shown a test result of the separation resistant property of the tire of the example 1 according to the invention as compared with those of the conventional tires. In FIG. 9, load × speed per an hour in $$\frac{Ton \cdot Km}{Hour}$$

is plotted on the ordinate and running time in hour is taken on the abscissa.

The test is of an accelerated one effected by an indoor drum testing machine. The tire was pressurized to an internal pressure of 3.5 Kg/cm$^2$. The load was increased from 60% to 170% in a stepwise manner as shown in FIG. 9 with the speed made constant as 11 Km/hour. In this case, 100% load corresponds to 6,135 Kg on the basis of the standard load for 17.5-25, tire as defined by JIS.

In FIG. 9, a point A shows a separation failure occurrence point in the tire of the example 1 according to the invention, a point B shows a separation failure occurrence point in a tire which makes use of a reinforcing element composed of two rubberized layers each containing approximately 44 reinforcing elements per 100 mm of the rubberized layer, each reinforcing element being composed of a bundle of 14 helically formed filaments each having a diameter $\phi$ of 0.25 mm, an average diameter D of the helix delineated by the filament of 0.95 mm, (Dmax/Dmin)=1.25, (D/$\phi$)=3.8, and pitch of 10.5 mm. The other structure of the tire is the same as that of the example 1 according to the invention. The filament is formed of material having a tensile strength of 280 Kg/mm$^2$. The elongation at breaking strength of the reinforcing element is 0.34 times that of the carcass cord. The ratio $\delta$ of the space formed between the two adjacent reinforcing elements to the pitch between the midlines of these elements is 0.07 which is far smaller than that of the tire of the example 1 according to the invention. In FIG. 9, a point C shows a separation failure occurrence point in the nylon breaker tire.

As shown by the point B, the conventional steel breaker tire exceeded its limit temperature at the fourth step of the 130% load, thus resulting in the breaker separation due to overheat. On the contrary, as shown by the point A, the tire of the example 1 according to the invention safely passed through this fourth step and arrived at the fifth step of the 150% load where the breaker layer showed separation therein. This separation resistant property of the tire of the example 1 according to the invention is substantially equal to that of the nylon breaker tire shown by the point C.

In FIG. 10 is shown an improved "peel resistant force" which has widely been used in place of the separation resistant property. In FIG. 10, the peel resistant force in Kg/25 mm is plotted on the ordinate and the kind of tires is plotted on the abscissa.

In the present test, use was made of a test piece taken out of the crown center portion of the finished tire and having a width of 25 mm and circumferential length of 250 mm. The peel resistant forces at points a, b for the tire A of example 1 according to the invention and points a', b' for the conventional steel breaker tire B were measured at room temperature, respectively.

In FIG. 10, the tires A and B are of the same constructions as those shown by the curves A and B in FIG. 7A, respectively. As seen from FIG. 10, the peel resistant force of the tire A of the example 1 according to the invention is larger than that of the conventional steel cord breaker tire by approximately 50%.

Figure 4:
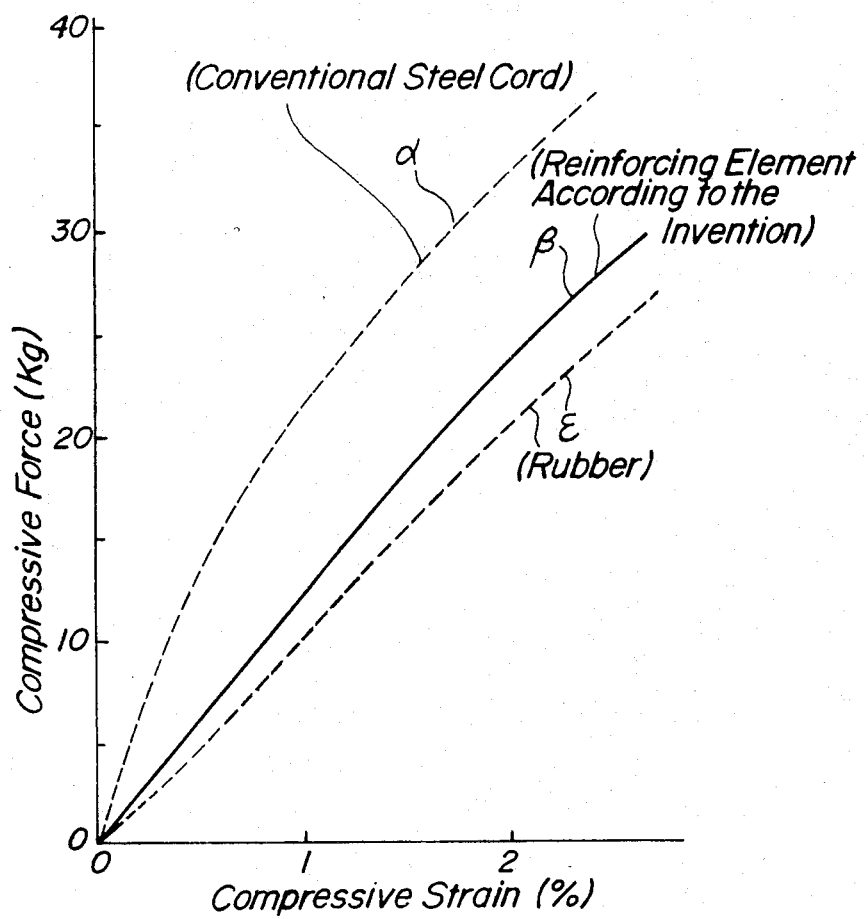
FIG. 4 is a graph illustrating compression test results from a reinforcing element according to the invention as compared with those yielded from conventional steel cord and rubber cord.
Figure 5:
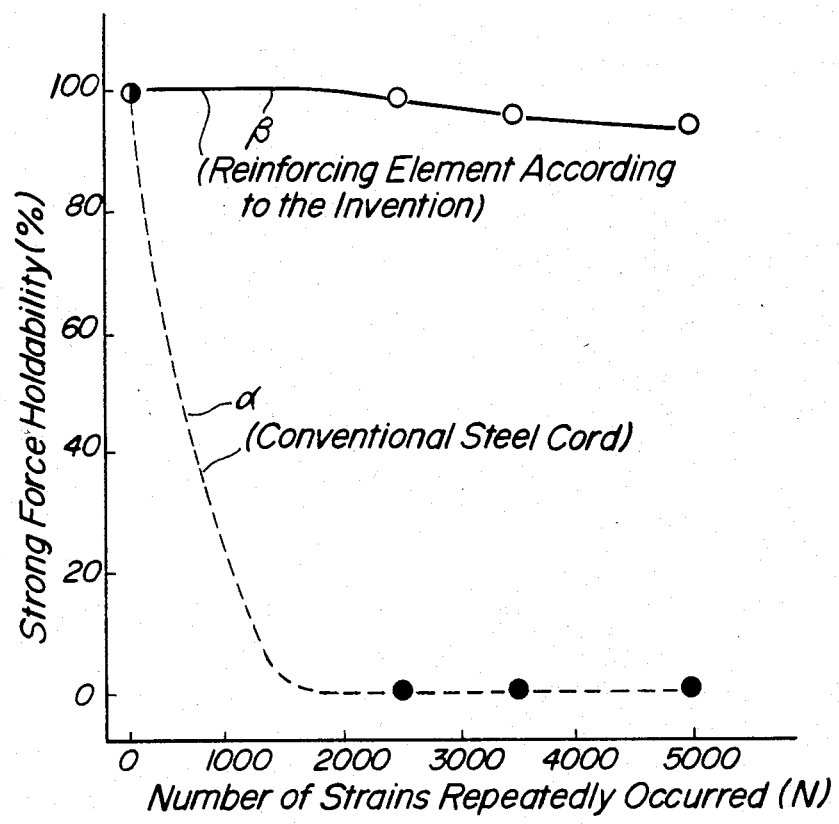
FIG. 5 is a graph illustrating compressive fatigue test results from a reinforcing element according to the invention as compared with that yielded from a conventional steel cord.

The reinforcing element according to the example 1 is the same as that shown by the curve β in FIGS. 3, 4 and 5 and has also the "cord breaking resistant property" as shown in FIGS. 4 and 5.

EXAMPLE 2

In FIG. 11 is shown a cross section of one-half of a tire, parts being shown vertical center section through the rotational axis of the tire. The tire shown in FIG. 11 is of a first kind of tire for construction vehicles as defined by JIS D 6401, that is, an ordinary tire having an extra tread and a size of 18.00-25 32PR, 32PR being indicated on the basis of cotton yarn.

The tire shown in FIG. 11 comprises a bead member 1 composed of three sets of inner, intermediate and outer bead cores 1a, 1b and 1c, respectively, and a carcass ply 2 composed of 22 plies each consisting of nylon cord of 1,260 denier/2 strands.

8 plies 2a of the total 22 plies are wound about the inner bead bundle 1a from the inside toward the outside thereof and secured to the bead member 1. Six intermediate plies 2b of the total 22 plies are similarly wound about an intermediate bead core 1b from the inside toward the outside thereof and secured to the bead member 1. Four inside plies 2c' of 8 outer plies 2c of the total 22 plies are wound about the outer bead core 1c from the inside toward the outside thereof and secured to the bead member 1.

Finally, 4 outside plies 2c'' of the 8 outer plies 2c of the total 22 plies are extended along the lower surface of the outer, intermediate and inner bead cores 1c, 1b and 1a, respectively, and secured at their inner ends to a toe portion 1d of the bead member 1.

The cords of these carcass plies are disposed in each of the plies and extended along two directions symmetrically inclined at an angle of approximately 35° with respect to the equatorial line of the tire.

About these carcass plies 2 are superimposed breaker layers 7a, 7b extending across substantially overall tread width. Each of these breaker layers 7a, 7b is composed of a rubberized fabric containing a bundle of 14 helically formed steel filaments which serves as a reinforcing element. Each filament has a diameter $\phi$ of 0.175 mm, average diameter D of a helix delineated by the filament of 1.1 mm, (Dmax/Dmin)=1.20, (D/$\phi$)=6.3 and pitch of 11 mm. The number of the reinforcing elements per 100 mm of the rubberized fabric is approximately 30. These reinforcing elements are disposed in each of the rubberized layers and extended along two directions symmetrically inclined at an angle of approximately 35° with respect to the equatorial line of the tire.

The reinforcing element is the same as that having the test result shown by the curve γ in FIG. 3. The helically formed filament is formed of material having a tensile strength of 280 Kg/mm² and elongation at breaking strength which is 0.75 times that of the carcass cord. The ratio δ is 0.42.

About the breaker layers 7a, 7b are superimposed nylon cord layers 8a, 8b extending over a width which is wider than those of the breaker layers 7a, 7b. These nylon cord layers serve as a breaker protective layer which can improve the recap property of the tire. The nylon cords are extended along two directions symmetrically inclined at an angle with respect to the equatorial line of the tire.

In FIG. 12A is shown test results of the cut resistant property of the tire shown in FIG. 11 subjected to the type of cuts shown in FIG. 1A and compared with those of the conventional steel cord breaker tire and nylon breaker tire.

In FIG. 12A, load in Kg is plotted on the ordinate and displacement in mm is plotted on the abscissa.

The test was carried out as follows. In the first place, tires to be tested T were united with standard rims R of 13.00×25 and pressurized to a standard internal pressure of 5.6 Kg/cm², respectively. Then, the tires T remained as they were for about 24 hours and then were mounted on Amsler's testing machine which makes use of a tapered sharp cutter 9 and having a taper angle of approximately 15°, and blade width of 60 mm. The cutter 9 was urged against the tire T at a speed of 50 mm/min as shown in FIG. 11B. The cuts were observed with respect to the load as a function of the amount of displacement of the cutter 9.

In FIG. 12A, a full line curve A shows the test result of the tire of the example 2 according to the invention, a dotted lines curve B shows the test result of a conventional steel cord breaker tire comprising about 15 steel cords per 100 mm of the breaker layer and each steel cord being formed of the same material as the reinforcing element of the example 2 according to the invention and having a strand construction of 1×4+6×4+1, filament diameter $\phi$ of 0.175 mm and cord diameter of 1.26 mm. The sectional area of the steel per the same peripheral section of the breaker layer and other constructions are the same as those of the example 2 according to the invention. A dotted lines curve C shows test results of a nylon breaker tire comprising two rubberized breaker layers each containing 30 nylon cords per 50 mm of the breaker layer, each nylon cord being 840 denier/2 strands.

As seen from FIG. 12A the breaking energy Kg·m of the tire of the example 2 according to the invention shown by the full line curve A is larger than that of the conventional steel cord breaker tire shown by the dotted lines curve B by approximately 22%.

FIG. 13A shows test results of cut resistant property against the type of cuts shown in FIGS. 1B and 1C. In FIG. 13A, load in Kg is plotted on the ordinate, while displacement in mm is taken on abscissa.

The test was carried out by means of a cylindrical plunger 10 having a semi-spherical front end instead of the tapered sharp cutter shown in FIG. 12B in the same manner as the test described in reference to FIG. 12A.

In FIG. 13A, a full line curve A shows the test result of a tire whose construction is the same as that of the tire whose test result is shown by the full line curve A in FIG. 12A, while a dotted lines curve B shows the test result of a tire whose construction is the same as that of the tire whose test result is shown by the dotted lines curve B in FIG. 12A.

As seen from FIG. 13A, the breaker layers of both the tire of the example 2 according to the invention and the conventional steel cord breaker tire do not show the premature breaking phenomenon shown in FIG. 8A which has been encountered with the tire having the size of 17.5-25 12PR of example 1 according to the invention. These breaker layers become broken at the same time as the breakage of the tires as a whole. As seen from FIG. 13A, the breaking energy in Kg·m of the tire of the example 2 according to the invention shown by the full line curve A is larger than that of the conventional steel cord breaker tire shown by the dotted lines curve B by approximately 25%.

In FIG. 14 is shown a test result of the separation resistant property of the tire of the example 2 according to the invention as compared with those of the conventional steel cord breaker tire and nylon breaker tire.

In FIG. 14, load×speed per an hour in $$\frac{Ton \cdot Km}{Hour}$$

is plotted on the ordinate and running time in hour is plotted on the abscissa.

The test is of an accelerated one effected by an indoor drum testing machine. The tire was pressurized to an internal pressure of 5.6 Kg/cm². The load was increased from 40% to 150% in a stepwise manner as shown in FIG. 14 with the speed made constant as 15 Km/hour. In this case, 100% load corresponds to 8,530 Kg on the basis of the standard load for 18.00–25 tire as defined by JIS.

In FIG. 14, a point A shows a separation failure occurrence point in the tire of the example 2 according to the invention, a point B shows a separation failure occurrence point in a conventional steel cord breaker tire described above with reference to FIG. 12A, and a point C shows a separation failure occurrence point in the nylon breaker tire having a construction which is the same as that described with reference to the dotted lines curve C shown in FIG. 12A.

As shown by the point B, the conventional steel cord breaker tire exceeded its limit temperature at the sixth step of the 140% load, thus resulting in the breaker separation due to overheat. On the contrary, as shown by the point A, the tire of the example 2 according to the invention safely passed through this sixth step and arrived at the seventh step of the 150% load where the breaker layer showed separation therein.

As seen from FIG. 14, the invention is capable of improving the separation resistant property of the pneumatic tire for off-road vehicles.

In accordance with the invention, two breaker layers 7a, 7b may be replaced by one or more than two breaker layers which may be arranged symmetrically and/or unsymmetrically with respect to a center line of a transverse section of the tire.

Figure 15:
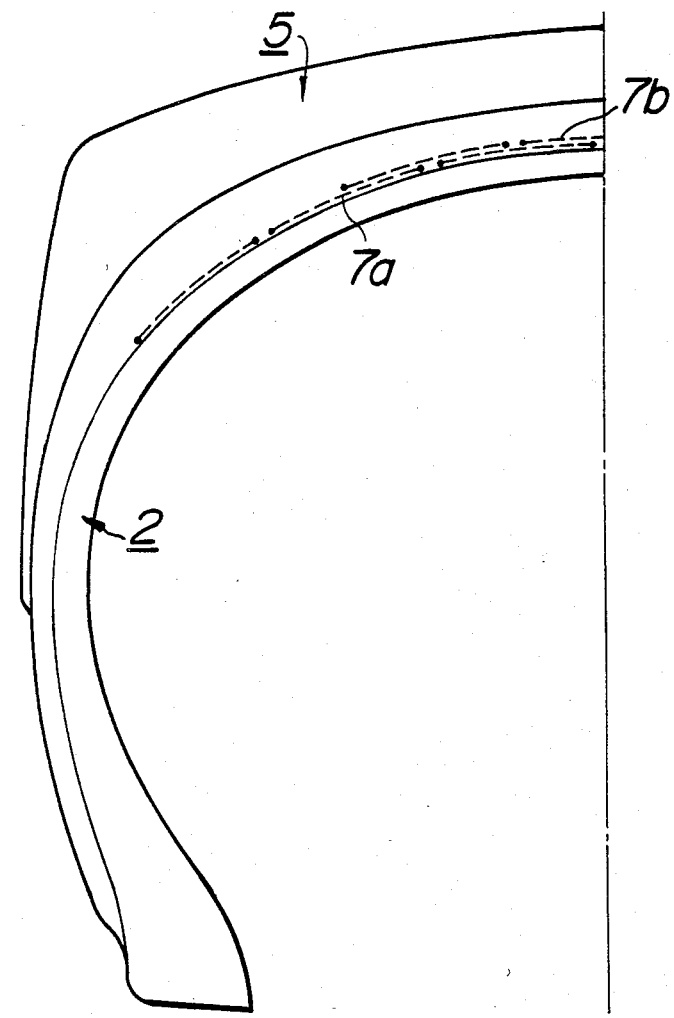

In FIG. 15 is shown a modified embodiment of the tire according to the invention. In the present embodiment, the breaker layers 7a, 7b are divided into a plurality of sections in their widthwise direction, respectively, the sections being spaced apart from each other. The breaker layer 7b which is located near the tread is made narrower in width than the breaker layer 7a.

Figure 16:
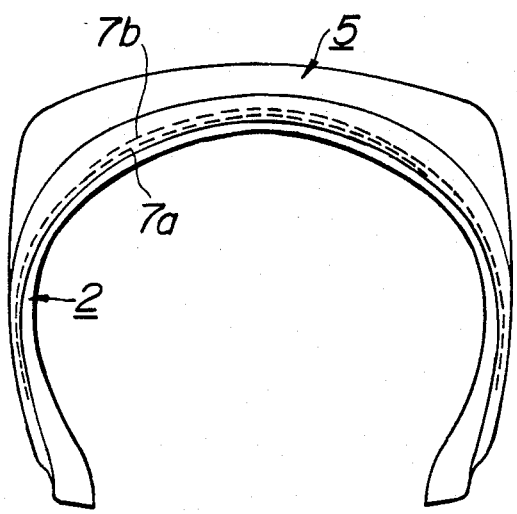

In FIG. 16 is shown another modified embodiment of the tire according to the invention. In the present embodiment, both the breaker layers 7a, 7b are extended up to the side portions of the tire so as to cover these portions.

Figure 17:
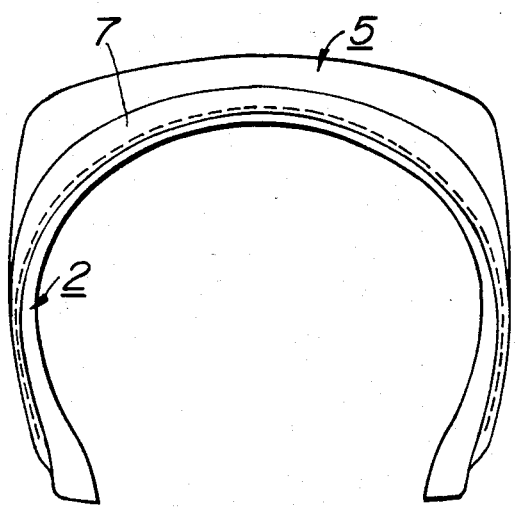

In FIG. 17 is shown a further modified embodiment of the tire according to the invention. In the present embodiment, use is made of only one breaker layer 7 which is extended to the side portions of the tire so as to cover these portions.

Figure 18:
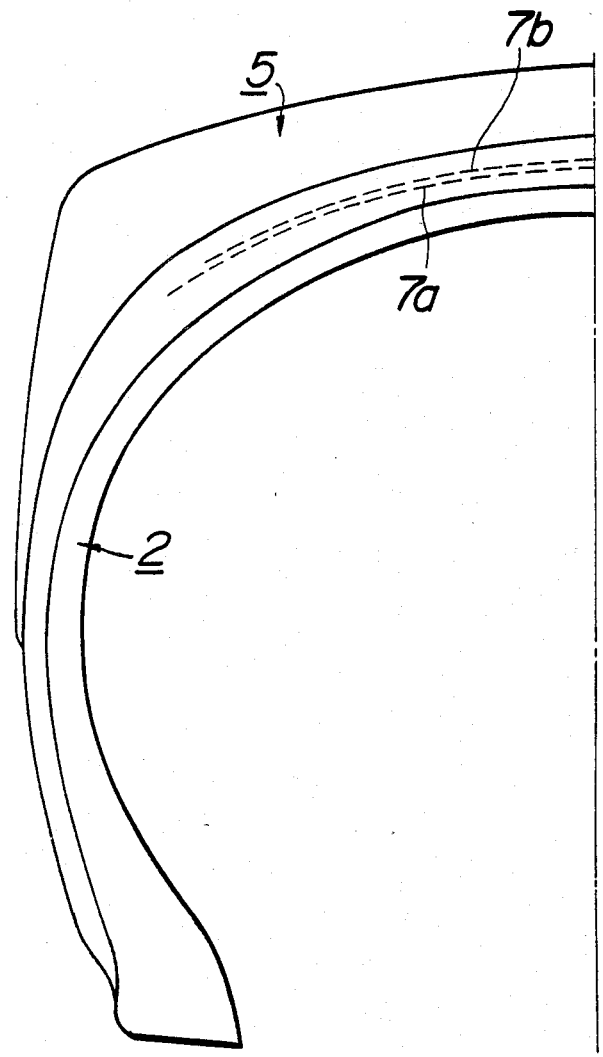

In FIG. 18 is shown a still further modified embodiment of the tire according to the invention. In the present embodiment, the breaker layers 7a, 7b are arranged in the tread layer.

Figure 19:
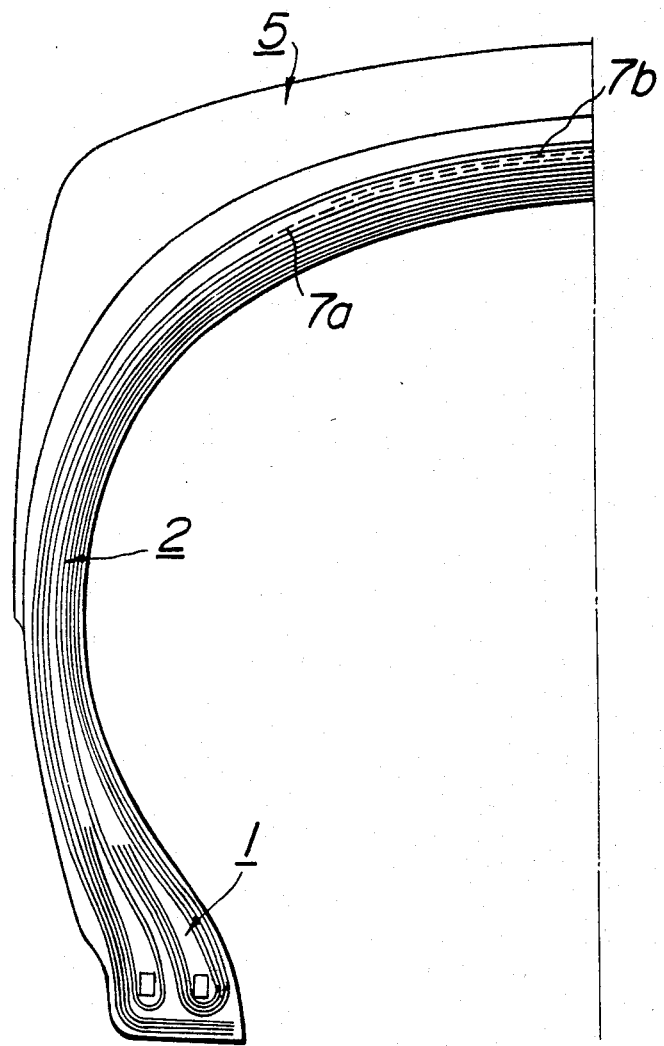

In FIG. 19 is shown another modified embodiment of the tire according to the invention. In the present embodiment, the breaker layers 7a, 7b are arranged between those carcass plies which are located near the tread.

Figure 20:
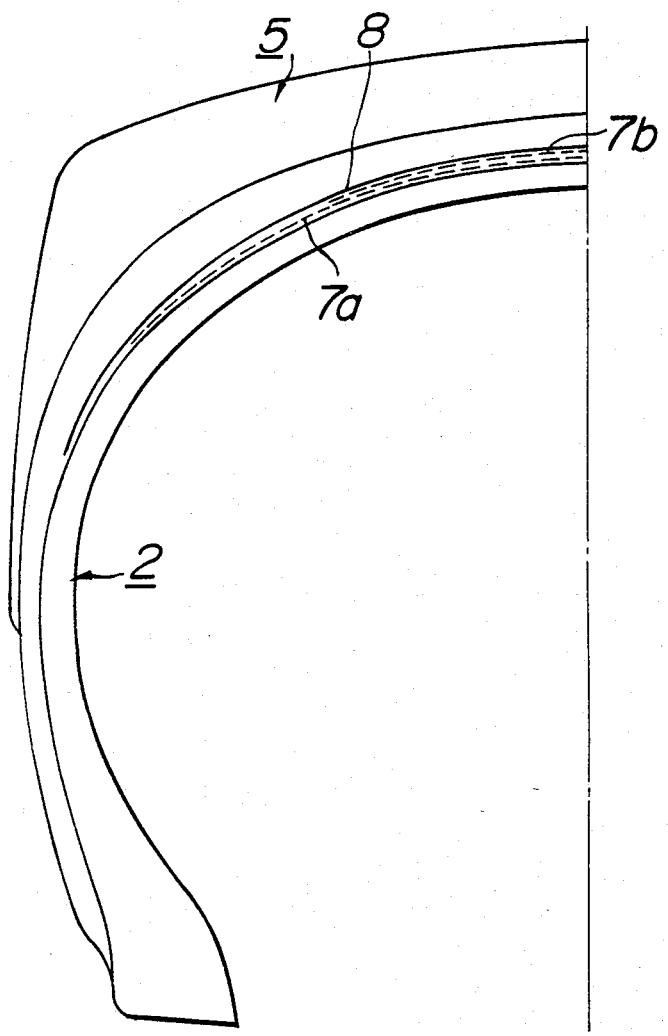

In FIG. 20 is shown a further modified embodiment of the tire according to the invention. In the present embodiment, use is made of one additional layer 8 which is superimposed about the breaker layers 7a, 7b and extended so as to cover each side edge thereof.

Figure 21:
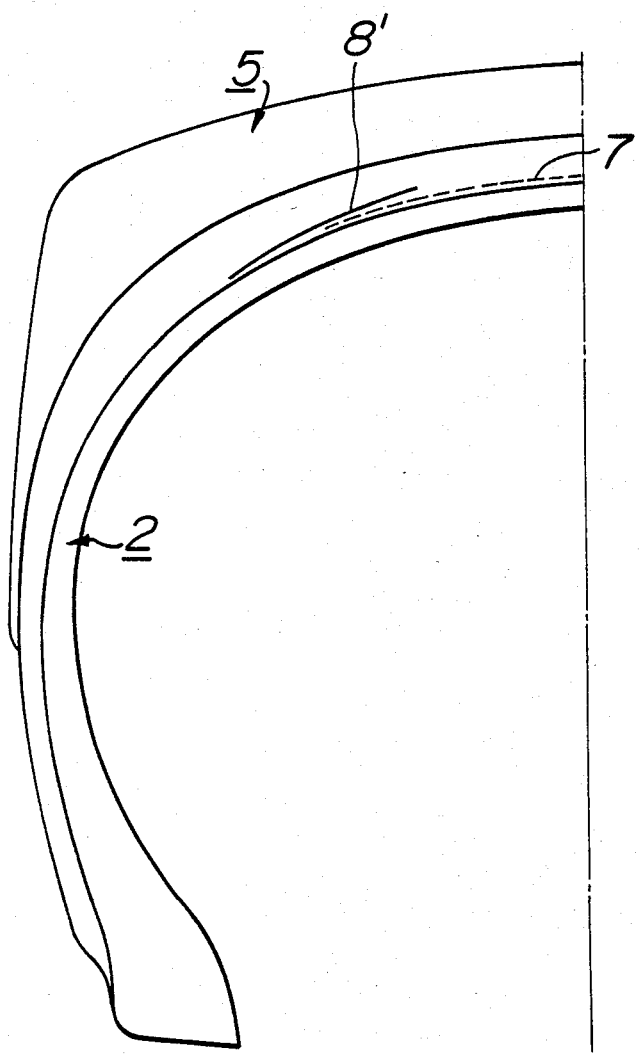

In FIG. 21 is shown a still further modified embodiment of the tire according to the invention. In the present embodiment, one additional layer 8' is superimposed about each side edge only of the breaker layer 7 so as to cover it.

Figure 22:
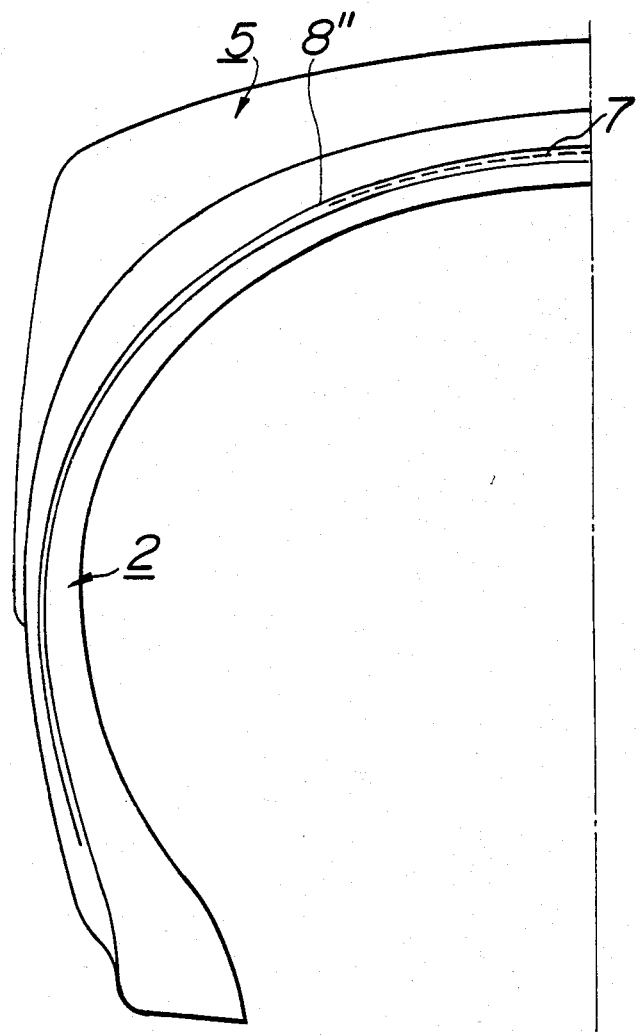

In FIG. 22 is shown another modified embodiment of the tire according to the invention. In the present embodiment, an additional layer 8" is extended along the side portions of the tire and arrived at near the bead members.

Figure 23:
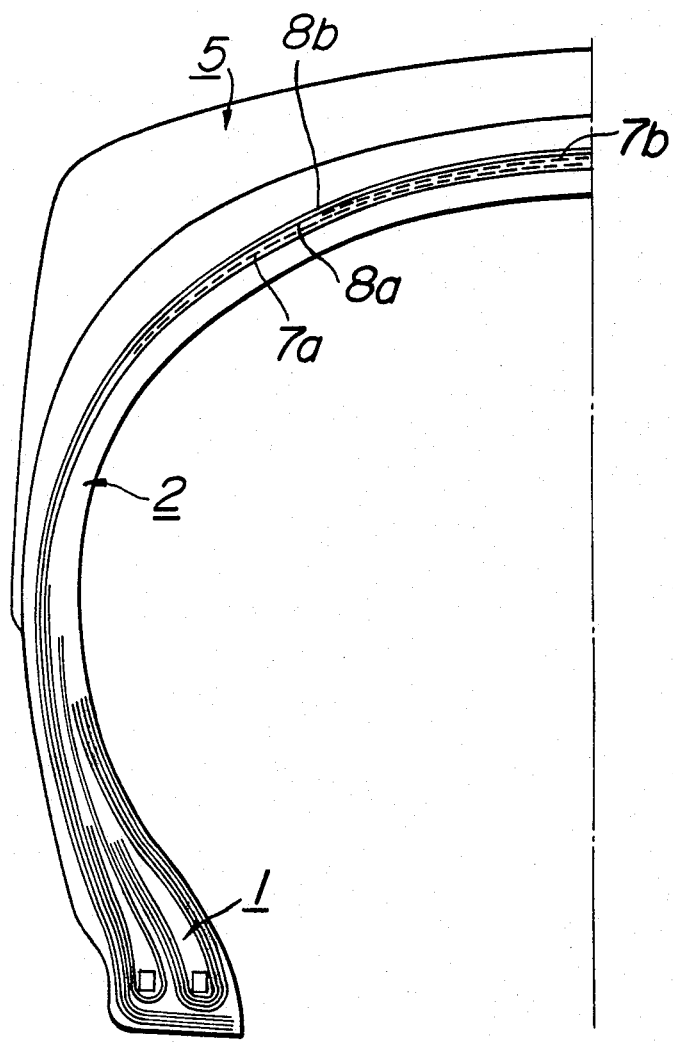

In FIG. 23 is shown a further modified embodiment of the tire according to the invention. In the present embodiment, use is made of two additional layers 8a, 8b composed of bias-laid carcass plies which constitute a part of the carcass plies and are extended through the lower surface of the bead member 1 up to the toe portion thereof.

What is claimed is:

1. A pneumatic off-road tire having improved cut resistant properties for use on vehicles running over unimproved surfaces, comprising:

a carcass body composed of a plurality of rubberized ply layers superimposed one upon the other and each containing nylon cords embedded therein, the cords of approximately one-half of the carcass ply layers extending in an opposite direction to the cords associated with the remaining carcass ply layers to define a bias construction, and a breaker superimposed about said carcass body and composed of at least one rubberized layer each containing extensible reinforcing elements embedded therein, said extensible reinforcing elements comprising a filament bundle formed by assembling 3 to 30 helically formed steel filaments together without twisting and each having an average diameter D projected on a plane perpendicular to the axial line of a helix delineated by one pitch of said helically formed filament having a diameter $\phi$ in the range of 0.13 to 0.5 mm and, $D \geq 3\phi$, said reinforcing elements being formed of material having a tensile strength of at least 140 Kg/mm² and having an elongation at breaking strength which is 0.25 to 1.4 times that of the nylon cord of said carcass body, said reinforcing element being inclined 30° to 55° with respect to the equatorial line of the tire, said breaker layer as a whole being extensible to prevent cut failure of the tire when running over unimproved surfaces.

2. A pneumatic tire for off-road vehicles as claimed in claim 1, wherein said organic fiber cords of said carcass body are inclined 23° to 45° with respect to the equatorial line of the tire.

3. A pneumatic tire for off-road vehicles as claimed in claim 1, wherein a ratio $\delta$ of a space formed between the two adjacent reinforcing elements to a pitch between the midlines of said reinforcing elements is given by $$\delta = \frac{S - (D + d - \phi)}{S};$$

where S is a pitch between midlines of the two adjacent reinforcing elements in mm, D is an average diameter of a helix delineated by one pitch of a helically formed filament in mm and d is a bundle diameter in mm which is given by $1.25 \times \sqrt{N} \times$ fillament diameter $\phi$ where N is number of filaments for constituting said reinforcing element.

4. A pneumatic tire for off-road vehicles as claimed in claim 1, wherein said rubberized layer of said breaker is formed of a rubber compound having a hardness defined by JIS K 6301 which makes use of a spring type hardness test (A type) at room temperature of 50° to 85°, 300% modulus of elasticity of 100 to 250 Kg/cm$^2$ and tensile strength of 150 to 250 Kg/cm$^2$.

5. A pneumatic tire for off-road vehicles as claimed in claim 1, wherein a ratio of the maximum diameter Dmax of a helix delineated by one pitch of a helically formed filament to the minimum diameter Dmin thereof is 1 to 1.5.

6. The pneumatic tire according to claim 1, wherein said average diameter D projected on a plane perpendicular to the axial line of a helix delineated by one pitch of said helically formed filament of diameter $\phi$ is, $D = (3-15)\phi$.

* * * * *